United States Patent [19]

Schneider et al.

[11] Patent Number: 4,760,002
[45] Date of Patent: Jul. 26, 1988

[54] CURRENT CONDUCTOR FOR A METAL OXIDE ELECTRODE IN AN ALKALINE ELECTROLYTE SYSTEM

[75] Inventors: Gerhard Schneider, Ellwangen; Helmut Laig-Horstebrock, Frankfurt, both of Fed. Rep. of Germany

[73] Assignee: Varta Batterie Aktiengesellschaft, Hanover, Fed. Rep. of Germany

[21] Appl. No.: 936,167

[22] Filed: Dec. 1, 1986

[30] Foreign Application Priority Data

Dec. 9, 1985 [DE] Fed. Rep. of Germany ....... 3543455

[51] Int. Cl.$^4$ ............................................. H01M 6/04
[52] U.S. Cl. .................................... 429/206; 429/224; 429/245; 429/209
[58] Field of Search ............... 429/178, 224, 206, 209, 429/245; 204/48; 227/124, 250

[56] References Cited

U.S. PATENT DOCUMENTS

| | | | |
|---|---|---|---|
| 2,322,613 | 6/1943 | Alexander | 427/250 X |
| 3,264,199 | 8/1966 | Fassell, Jr. | 204/48 X |
| 3,499,785 | 3/1970 | van Amstel | 427/250 X |
| 3,945,847 | 3/1976 | Kordesch et al. | 429/206 |
| 4,302,322 | 11/1981 | Oda et al. | 204/48 X |
| 4,555,317 | 11/1985 | Nicolas et al. | 204/48 X |
| 4,585,715 | 4/1986 | Marple | 429/224 X |

Primary Examiner—Anthony Skapars
Attorney, Agent, or Firm—Weiser & Stapler

[57] ABSTRACT

In connection with a metal oxide electrode in an alkaline electrolyte system, especially for a brownstone electrode, the presence of cobalt as a thin film or as an alloying consitituent at the surface of the positive current drain wire, which is preferably a nickel-plated steel cup or a deep-drawing steel plate, leads to a reduction of the contact resistance between the current drain wire and the MnO$_2$. To apply the cobalt, the current drain wire is preferably polarized in an aqueous CoSO$_4$ solution. The cobalt film, which is formed in a thickness of less than 1 micron (depending on the Co ion concentration and the selected current conditions), imparts resistance properties to the transition between the MnO$_2$ and the nickel-plated current drain wire even after prolonged storage, which can otherwise only be achieved with gold-plated current drain wires.

12 Claims, 1 Drawing Sheet

CURRENT CONDUCTOR FOR A METAL OXIDE ELECTRODE IN AN ALKALINE ELECTROLYTE SYSTEM

BACKGROUND OF THE INVENTION

The present invention relates generally to an improved current conductor or drain wire for a metal oxide electrode in an alkaline electrolyte system, particularly one which is provided with an additional foreign metal to reduce contact resistance.

The present invention generally relates to primary galvanic cells including a pressed metal oxide positive electrode, a negative electrode prepared from zinc powder, and an alkaline electrolyte taken up in a separator; disposed in a steel casing. The steel casing generally serves as the current conductor for the positive active mass (e.g., manganese dioxide or silver oxide).

Experience has shown that such primary cells are subject to the disadvantage that their discharge rate after prolonged storage is far lower than in their freshly prepared state. This is because during storage and under certain conditions, especially in cells of the alkaline $MnO_2/Zn$ primary system, a poorly conducting cover layer is formed on the current conductor of the positive metal oxide electrode which leads to an undersirable increase in the internal resistance of the cell. Since the manganese dioxide is pressed directly to the casing cup (made of steel or nickel-plated steel), the reduced service readiness of stored cells is explained by oxidation of the nickel layer, and the consequent increase in contact resistance in the transition between the metal oxide and the positive current conductor. The formation of such poorly conducting interfaces during the contact of a current conductor with an electrochemically active positive substance also occurs in primary cells with solid electrolytes.

As can be determined from U.S. Pat. No. 2,861,116, one attempt to remedy this situation was to use a material for the current conductor which is as inert as is possible. Platinum, palladium, tantalum, molybdenum, silver, nickel, lead, gold, titanium, zirconium and carbon were found to be suitable in this regard, among others. However, in German Patent No. 1,421,582, such teachings are dismissed as being too general, and gold is recommended as the preferable agent of choice. This takes the form of a gold coating on the positive steel container for the described galvanic primary cell (which is among the cells encompassed by the present invention).

A rather significant disadvantage to gold or gold-plated current conductors is the cost resulting from the selected material, and the processes which must be employed in using such material. Moreover, if mercury oxide is used as the positive electrode material, the gold will gradually become amalgamated during discharge of the mercury oxide. Thus, the utility of such a system is called into question due to the instability of the initially low contact resistance during storage. This problem is even more pronounced when silver is used as the current conductor material, since silver is also readily amalgamated by HgO and is eventually dissolved during operation of the cell.

SUMMARY OF THE INVENTION

It is therefore the primary object of the present invention to provide a current conductor (drain wire) for the positive metal oxide electrode of an alkaline primary system, especially an alkaline-manganese cell, which maintains the lowest possible stable contact resistance, even after prolonged storage and regardless of the cell's potential.

It is also an object of the present invention to provide a current conductor having such properties which can be economically realized during the cell's manufacturing process.

These and other objects are accomplished according to the present invention by providing a current conductor (drain wire) for a metal oxide electrode in an alkaline electrolyte system wherein cobalt is present in metallic form or in the form of a cobalt-containing compound at least at the surface of the current conductor, to reduce the contact resistance at that interface.

For further details regarding a metal oxide electrode according to the present invention, reference is made to the detailed description which follows, taken in conjunction with the following illustrations.

DETAILED DESCRIPTION OF THE PREFERRED EMBODIMENT

Figure 1:
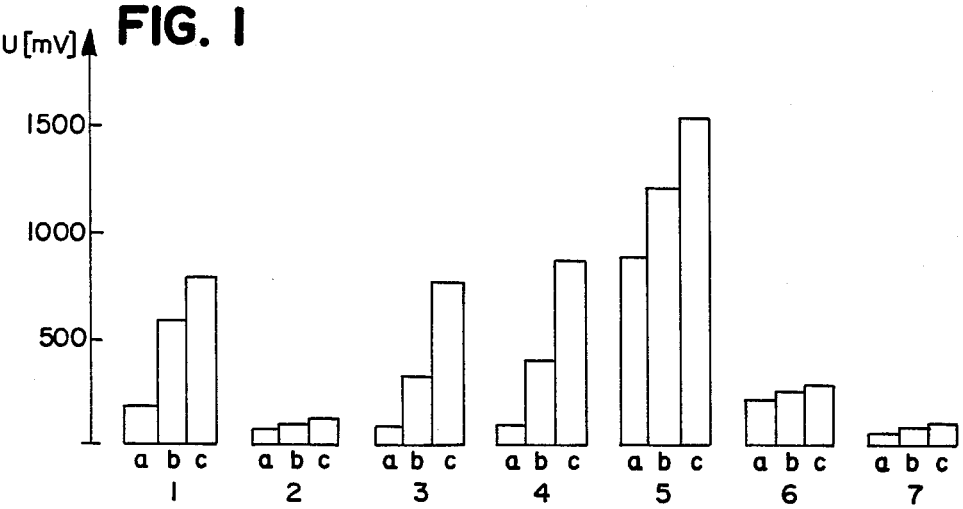
FIG. 1 is a graph showing voltage drop as an indicator of contact resistance for different current drain surfaces after different storage times.

The solution according to the present invention is especially effective in $MnO_2$ electrodes. In such cases, the cobalt concentration at the surface of the current drain wire should be at least 0.1 atom % relative to pure cobalt.

A nickel surface is highly favorable for application of the cobalt or cobalt compound to the current drain wire. However, the carefully cleaned surface of a steel plate is also suitable, in principle. Since the steel plate used to manufacture the cell cup is, in general, galvanically nickel-plated and also heat treated, the resulting surface is therefore well suited to treatment according to the present invention. If desired, deeper penetration of the nickel atoms into the steel surface is achievable by so-called diffusion annealing. The nickel-plated steel plate thus acquires a deep-drawing quality.

Cobalt coating of the current drain wire according to the present invention is especially advantageous in that it fully permits non-machined shaping of the steel plate (e.g., by deep drawing). Neither the cobalt layer per se, nor the applied nickel layer (applied, e.g., to a deep-drawn steel plate) needs to be completely pore-free. Moreover, it is possible to apply the cobalt, as will be discussed more fully below, either after the usual diffusion annealing of the nickel-plated steel strip, or before the diffusion annealing (possibly simultaneously with the galvanic nickel-plating). The cobalt will then occur at the surface layer as an alloyed constituent, preferably as a Ni/Co or Ni/Co/Fe alloy. It has been found (See FIG. 1 and the accompanying explanation as provided below) that a metal alloy of 28% Ni, 18% Co, and 54% Fe (manufactured under the tradename "Vacon 10") will exhibit a relatively low and stable contact resistance. It is also possible to apply the cobalt to finished and shaped current drain wires for alkaline $MnO_2$ electrodes.

In practice, various processes are available for applying cobalt or a cobalt compound to the current drain wire surface. A chemical process includes depositing cobalt as a uniform layer from a cobalt salt solution on the current drain wire by means of a reducing agent. If nickel is the actual substrate for the deposition, the nickel also has an especially favorable catalytic activity. Another method is the electrochemical reduction of cobalt ions, which has the added advantage that oxide film present at the surface is simultaneously broken down by the cathodic polarization of the base metal of the current drain wire. Moreover, the electrochemical method is particularly useful since it can be combined with the galvanic nickel-plating of the base metal (e.g. a deep-drawn steel plate) in an efficient manner. Further processes are of a physical metallurgical nature in which the cobalt is applied, for example, by vapor deposition or hot plating.

It has been found that not all aqueous cobalt ion solutions are equally well suited to the present invention. For example, $Co(NO_3)_2$ is totally unsuitable because of the formation of ammonia, which leads to undesirable secondary reactions. In contrast, an aqueous cobalt sulfate solution, which is prepared from 50 to 100 g $CoSO_4.7\ H_2O$ in 50 ml $H_2O$, can be used with very good results.

The suitable current density range for the cathodic nickel treatment of the surface is between 5 and 100 $mA/cm^2$, and preferably between 20 and 50 $mA/cm^2$. Under these conditions, a treatment time of only 10 to 50 seconds is sufficient to achieve reduction of the contact resistance according to the present invention. The foregoing treatment will hereinafter be referred to as "cobalting". The thickness of the layer formed in this process is in the micron range. The treatment can be performed at room temperatures. After such treatment, the cobalted surface is perferably rinsed with distilled or desalinated water and dried in a conventional manner (e.g., with warm air).

The surprising effects of cobalting the current drain wire were experimentally verified using different contact surfaces for comparative testing in a resistance measuring system. The test apparatus developed for this purpose received a tablet-shaped $MnO_2$ electrode between an oxidation-free (e.g., gold-plated) contact surface and a contact surface to be tested. The test surface was pretreated in specified manner. An adjustable pressure exerted on the resulting stack of layers was taken up by an appropriate support.

The $MnO_2$ tablet was impregnated with about 40% KOH. A surrounding housing prevented the impregnated tablet from drying out, as well as preventing reaction of the KOH with $CO_2$ present in the air. The surfaces in contact with either side of the $MnO_2$ electrode were interconnected by an external circuit including a device for setting a constant current (i), an ammeter for checking the established current, and a voltmeter for determing the voltage drop (U) at a given current. After the established current was set in current-stabilized fashion, the voltage drop was obtained from the equation $U = i\ (R_1+R_2+R_3)$, wherein $R_1$ is the contact resistance between the oxidation-free contact surface and the $MnO_2$ tablet, $R_2$ is the resistance of the $MnO_2$ tablet, and $R_3$ is the contact resistance between the $MnO_2$ tablet and the contact surface to be tested.

Using a brownstone tablet of the selected dimensions of 10 mm $\times$ 5 mm (diameter $\times$ height) and a composition of 88% $MnO_2$, 10% graphite and 2% polyethylene (as a binder), it was first demonstrated under a pressure of 75 $kp/cm^2$ and a given temperature that the changes in resistance occurring during storage are exclusively caused by changes in the contact resistance $R_3$ (i.e., the resistance between the brownstone tablet and the current drain layer) if the drain layer is, for example, a nickel-plated steel layer as is commonly used in alkaline zinc/brownstone systems. In other words, the resistances $R_1$ (between the gold-plated currrent drain wire and the $MnO_2$ tablet) and $R_2$ (of the $MnO_2$ tablet) are not only relatively stable during storage, but are also relatively low compared with the resistance $R_3$ in the test system.

Various selected and pretreated current drain wires responsible for the resistance $R_3$ were then tested according to this measurement method by determining the voltage drop (U) as defined above:

(a) immediately after assembly of the measuring system;
(b) after a storage time of 24 hours; and
(c) after a storage time of 96 hours;

under the conditions of a storage temperature of 90° C. and a constant measuring current of 500 mA. Because of the relatively high storage temperature, the relatively short storage times were sufficient to assess the quality of a current drain wire of defined nature and pretreatment. This is because storage at 70° C. for one month approximately corresponds to a storage time of 1 to 1.5 years at room temperature.

The $U = i\ R$ values obtained according to the aforementioned measurement methods are plotted in FIG. 1 for different selected and pretreated current drain wires (1 through 7). Three measured values are given for each current drain wire according to the aforementioned storage times (a, b and c). The individual potentials (U) are read on the ordinate, with the higher potentials indicating higher resistances ($R_3$) and vice versa.

Bar graph 1 shows the results obtained for an untreated nickel-plated steel surface. As is seen, the contact resistance increases fivefold within 96 hours under the specified conditions.

Bar graph 2 shows the behavior of a gold-plated nickel contact. As is seen, the measured resistances are lower than the initial resistance represented in Bar graph 1, even after 96 hours.

Bar graph 3 shows the behavior of a nickel surface treated with a fine emery paper. This abrasive treatment was carried out with the intended purpose of removing the thicker nickel oxide films which may be present before the contact experiment. As is seen, the initial value obtained is comparable to that obtained with gold (Bar graph 2). However, this relatively low initial resistance increased nearly sixfold after 24 hours, and rose to fourteen times the initial value after 96 hours.

Bar graph 4 shows the results of an experiment carried out to incorporate lithium ions in the oxidic nickel surface by cathodic polarization in a LiOH solution. As can be seen, the experiment had negative results at least under the selected conditions. Contact problems in $MnO_2$/Li/Ni current drain systems have recently also been reported by other investigators (N. A. Fleischer and R. J. Ekern, *J. Electrochem. Soc.*, Vol. 132, January 1985).

Bar graph 5 shows an even more dramatic deterioration of the current drain contact. In this case, the nickel-plated current drain contact was experimentally cathodically polarized in an $MnSO_4$ solution, so that manganese might become "incorporated" in the near-surface nickel layer. As is seen, even the initial resistance is more than eight times the 96-hour resistance of gold (Bar graph 2).

These results show that incorporating foreign metals or foreign metal ions in the nickel surface layer, as well as the nature of the pretreatment of the nickel current drain, are of crucial significance in determining the properties of the contact layer.

Bar graph 6 shows the behavior of a cobalted surface layer according to the present invention, using "Vacon 10" in performing the surface treatment. From the results obtained, it is seen that "cobalt" is responsible for a rather favorable contact resistance behavior in the manufacture of a surface layer structure according to the present invention (low resistance, stable over time, compatible with $MnO_2$ in the alkaline electrolyte).

To verify the influence of cobalt, the nickel-plated steel current drain (which was used for practically all measurements) was polarized in an aqueous cobalt ion solution. As is seen in Bar graph 7, a surprisingly favorable and unexpectedly strong effect was observed. Indeed, the result is comparable with that obtained with gold (Bar graph 2).

From the results obtained, it is seen that not only the electrochemical deposition of cobalt, but also its addition for alloying, are highly effective.

Another interesting observation was that the $MnO_2$ tablet, which was mounted and investigated as previously described, became firmly bound to the cobalted nickel surface. This is contrary to a pure $MnO_2$/nickel contact. The $MnO_2$ tablet is quasi-welded to the surface of the current drain conductor according to the present invention. It can therefore be assumed that a conductive Mn, Co and Ni-oxide/hydroxide structure develops, which is specific to the $MnO_2$/Co interface.

Figure 2:
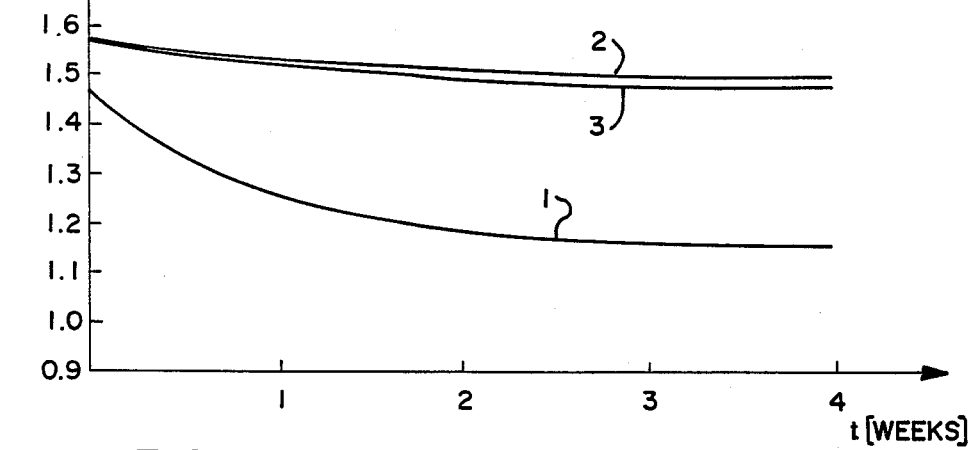
FIG. 2 is a graph showing load currents for zinc/brownstone primary cells of the LR-14 type as a function of storage time, in comparison with cells having a cobalt or a gold-plated current drain wire.
Figure 3:
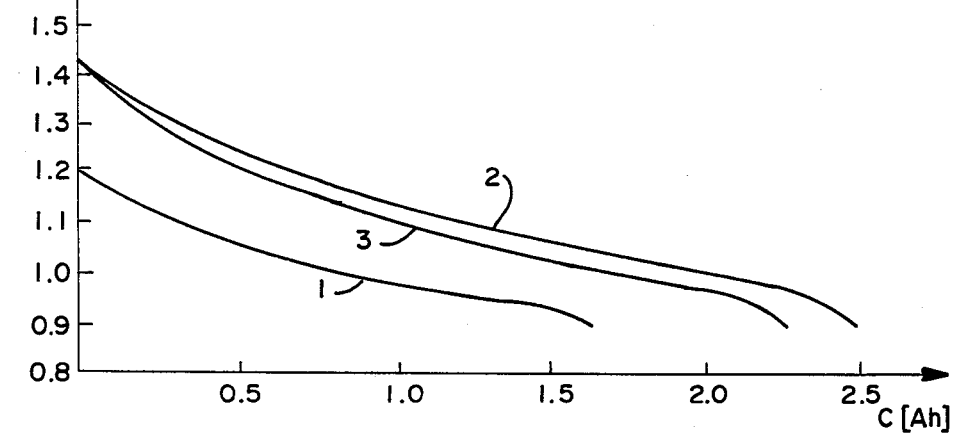
FIG. 3 is a graph showing a comparison of such cells with respect to their discharge characteristics.

Further experimental results which are indicative of the advantages of cobalted current drain wires according to the present invention are seen in FIGS. 2 and 3. The illustrated curves show voltage characteristics under load as a function of storage time, and the discharge characteristics of three alkaline zinc/brownstone primary cells of the round cell type (LR-14: according to IEC). Curve 1 corresponds to an untreated nickel-plated steel cup (standard cell). Curve 2 corresponds to a nickel-plated and subsequently gold-plated steel cup. Curve 3 corresponds to a nickel-plated and subsequently cobalted steel cup (according to the present invention).

FIG. 2 shows the voltage drop (U) under a load of 2 Ohms for a duration of 0.2 seconds as a function of the storage time at 70° C. It is seen that after one month, the untreated steel cup (curve 1) has a load voltage (U) which (measured at room temperature) is about 300 mV lower than that of the cobalted cup (curve 3). In contrast, the load voltage of the cobalted cup (curve 3) is only about 25 mV lower than that of the gold-plated cup (curve 2). This result is in agreement with the results shown in FIG. 1 (Bar graphs 1, 2 and 7) and is indicative of the excellent effects of cobalting.

FIG. 3 shows the result of a vary "hard" continuous discharging under a load of 2 Ohms. It is seen that the cell with the untreated steel cup delivers only 1.58 ampere-hours until the final discharge voltage of 0.9 V is reached (curve 1), whereas the cell with the cobalted steel cup delivers 2.3 ampere-hours (curve 3). Consequently, cobalting has improved the discharge capacity by about 50% as compared with the non-cobalted steel cup. Moreover, the cell with the gold-plated steel cup (curve 2) is only about 0.2 ampere-hours higher than the result obtained with the cobalted cup.

It should be mentioned that results of this kind are also dependent on the actual quality of the brownstone used. However, irrespective of the quality of the brownstone used, the cobalted steel cup or the cobalt-containing steel cup will always be notably better than the steel cup without cobalting. Thus, as to the contact resistance between an alkaline $MnO_2$ electrode and a nickel-plated current drain wire, it is apparent from the foregoing data that cobalt or cobalting serves to impart properties which are equivalent to those imparted by gold-plating of the current drain wire.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A galvanic cell comprising:
   a negative electrode;
   a metal oxide positive electrode;
   an alkaline electrolyte in a separator disposed between the negative electrode and the metal oxide positive electrode; and
   a current conductor with a surface for receiving the metal oxide positive electrode, cobalt in metallic form or in the form of a cobalt-containing compound is present at least at the surface of the current conductor which receives the metal oxide positive electrode, to reduce the contact resistance between the metal oxide positive electrode and the current conductor.

2. The galvanic cell of claim 1 wherein the metal oxide is $MnO_2$.

3. The galvanic cell of claim 1 wherein the cobalt content of the current conductor surface is at least 0.1 atom % relative to metallic cobalt.

4. The galvanic cell of claim 3 wherein the cobalt or the cobalt compound is applied to a nickel surface.

5. The galvanic cell of claim 4 wherein the base material of the conductor is a nickel-plated deep-drawn steel plate.

6. The galvanic cell of claim 5 wherein the cobalt is present as an alloying constituent.

7. The galvanic cell of claim 6 wherein the cobalt is present as a Ni/Co or a Ni/Co/Fe alloy.

8. The galvanic cell of claim 1 wherein the cobalt or the cobalt compound is applied to the surface by a chemical or electrochemical process.

9. The galvanic cell of claim 8 wherein the cobalt is applied to the surface by deposition from a cobalt salt solution.

10. The galvanic cell of claim 9 wherein the cobalt salt solution is a cobalt sulfate solution.

11. The galvanic cell of claim 1 wherein the cobalt or the cobalt compound is applied to the surface by a physical metallurgical process.

12. The galvanic cell of claim 11 wherein the physical metallurgical process is vapor deposition or hot plating.

* * * * *